(12) United States Patent
Resch

(10) Patent No.: US 10,437,677 B2
(45) Date of Patent: Oct. 8, 2019

(54) OPTIMIZED DISTRIBUTED REBUILDING WITHIN A DISPERSED STORAGE NETWORK

(71) Applicant: International Business Machines Corporation, Armonk, NY (US)

(72) Inventor: Jason K. Resch, Chicago, IL (US)

(73) Assignee: PURE STORAGE, INC., Mountain View, CA (US)

(*) Notice: Subject to any disclaimer, the term of this patent is extended or adjusted under 35 U.S.C. 154(b) by 111 days.

(21) Appl. No.: 15/842,768

(22) Filed: Dec. 14, 2017

(65) Prior Publication Data

US 2018/0107549 A1 Apr. 19, 2018

Related U.S. Application Data

(63) Continuation-in-part of application No. 14/986,279, filed on Dec. 31, 2015, now Pat. No. 10,069,915.

(60) Provisional application No. 62/121,667, filed on Feb. 27, 2015.

(51) Int. Cl.
*G06F 11/10* (2006.01)
*G06F 3/06* (2006.01)

(52) U.S. Cl.
CPC .......... *G06F 11/1092* (2013.01); *G06F 3/064* (2013.01); *G06F 3/065* (2013.01); *G06F 3/067* (2013.01); *G06F 3/0619* (2013.01); *G06F 3/0689* (2013.01); *G06F 11/1076* (2013.01)

(58) Field of Classification Search
CPC ............. G06F 11/1092; G06F 11/1076; G06F 3/0619; G06F 3/064; G06F 3/065; G06F 3/067; G06F 3/0689
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Blake J Rubin
(74) *Attorney, Agent, or Firm* — Garlick & Markison; Timothy W. Markison

(57) ABSTRACT

A method includes performing, by a storage unit, a rebuild scanning function to identify an encoded data slice in need of rebuilding. The method further includes identifying, by the storage unit, storage units in the set of storage units storing encoded data slices of the set of encoded data slices that are usable for rebuilding the encoded data slice in need of rebuilding. The method further includes selecting, by the storage unit, one of the identified storage units to rebuild the encoded data slice in need of rebuilding based on a selection protocol. The method further includes sending, by the storage unit, a rebuild command to the one of the identified storage units regarding rebuilding the encoded data slice in need of rebuilding, wherein, in accordance with a rebuilding function, the one of the identified storage units rebuilds the encoded data slice in need of rebuilding.

14 Claims, 10 Drawing Sheets

(56) References Cited

U.S. PATENT DOCUMENTS

| | | | |
|---|---|---|---|
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,552,242 B1* | 1/2017 | Leshinsky | G06F 11/0727 |
| 9,552,254 B1* | 1/2017 | Franklin | G06F 11/1004 |
| 9,772,916 B2* | 9/2017 | Rangasamy | G06F 11/2033 |
| 9,785,510 B1* | 10/2017 | Madhavarapu | G06F 11/1446 |
| 9,817,587 B1* | 11/2017 | Leshinsky | G06F 16/219 |
| 9,973,215 B1* | 5/2018 | Sivakumar | H03M 13/13 |
| 10,042,710 B2* | 8/2018 | Mutalik | G06F 16/1844 |
| 10,241,712 B1* | 3/2019 | Elliott, IV | G06F 3/065 |
| 10,303,564 B1* | 5/2019 | Gupta | G06F 11/1474 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0332751 A1 | 12/2010 | Quigley et al. | |
| 2013/0227236 A1* | 8/2013 | Flynn | G11C 16/26 711/165 |
| 2014/0007239 A1* | 1/2014 | Sharpe | G06F 21/561 726/24 |
| 2014/0156716 A1 | 6/2014 | Baptist et al. | |
| 2014/0298135 A1* | 10/2014 | Dhuse | G06F 11/2094 714/763 |
| 2014/0337667 A1* | 11/2014 | Postage | G06F 11/1402 714/15 |
| 2015/0269023 A1* | 9/2015 | Taranta, II | G06F 11/1076 714/766 |
| 2016/0057226 A1* | 2/2016 | Bestler | G06F 11/1076 709/217 |
| 2016/0371145 A1* | 12/2016 | Akutsu | G06F 3/0619 |
| 2017/0075965 A1* | 3/2017 | Liu | G06F 16/27 |
| 2017/0264317 A1* | 9/2017 | Datta | H03M 13/3761 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Directory Information Models; IETF Network Working Group; RFC 4512; Jun. 2006; pp. 1-49.

(56) References Cited

OTHER PUBLICATIONS

Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Internationalized String Preparation; IETF Network Working Group; RFC 4518; Jun. 2006; pp. 1-14.

* cited by examiner

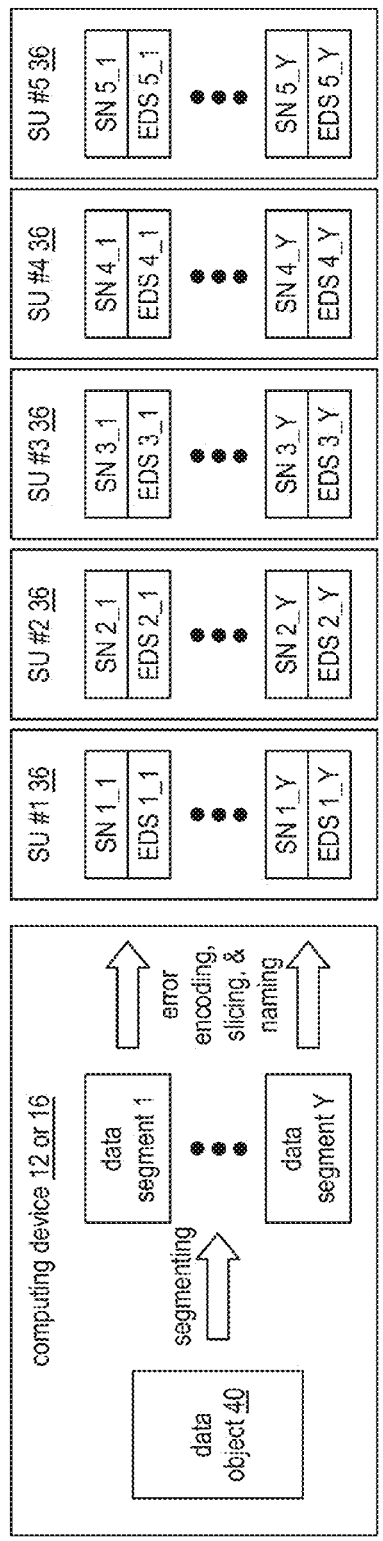
FIG. 3
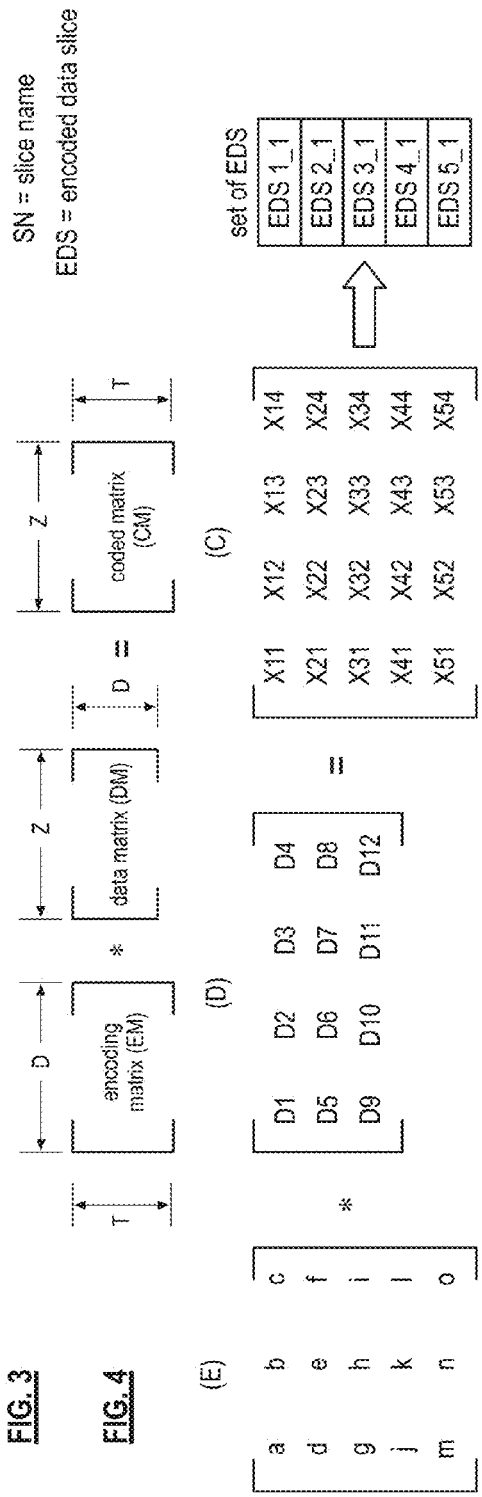
FIG. 4
FIG. 5
FIG. 6

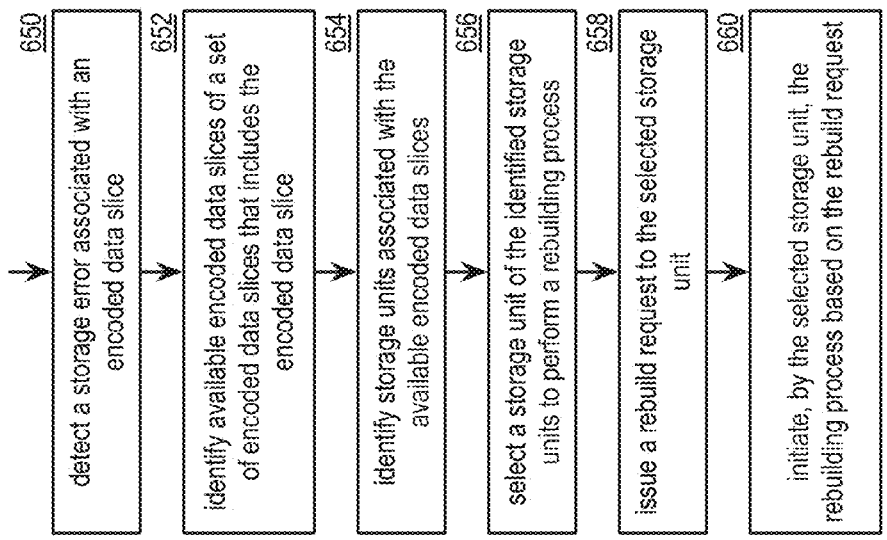

OPTIMIZED DISTRIBUTED REBUILDING WITHIN A DISPERSED STORAGE NETWORK

CROSS-REFERENCE TO RELATED APPLICATIONS

The present U.S. Utility Patent Application also claims priority pursuant to 35 U.S.C. § 120 as a continuation-in-part of U.S. Utility application Ser. No. 14/986,279, entitled "STORING DATA IN A DISPERSED STORAGE NETWORK," filed Dec. 31, 2015, which claims priority pursuant to 35 U.S.C. § 119(e) to U.S. Provisional Application No. 62/121,667, entitled "SELECTING A STORAGE POOL OF A DISPERSED STORAGE NETWORK," filed Feb. 27, 2015, now expired; all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10B is a logic diagram of an embodiment of a method for performing a distributed rebuilding operation in accordance with the present invention.

DETAILED DESCRIPTION OF THE INVENTION

Figure 1:
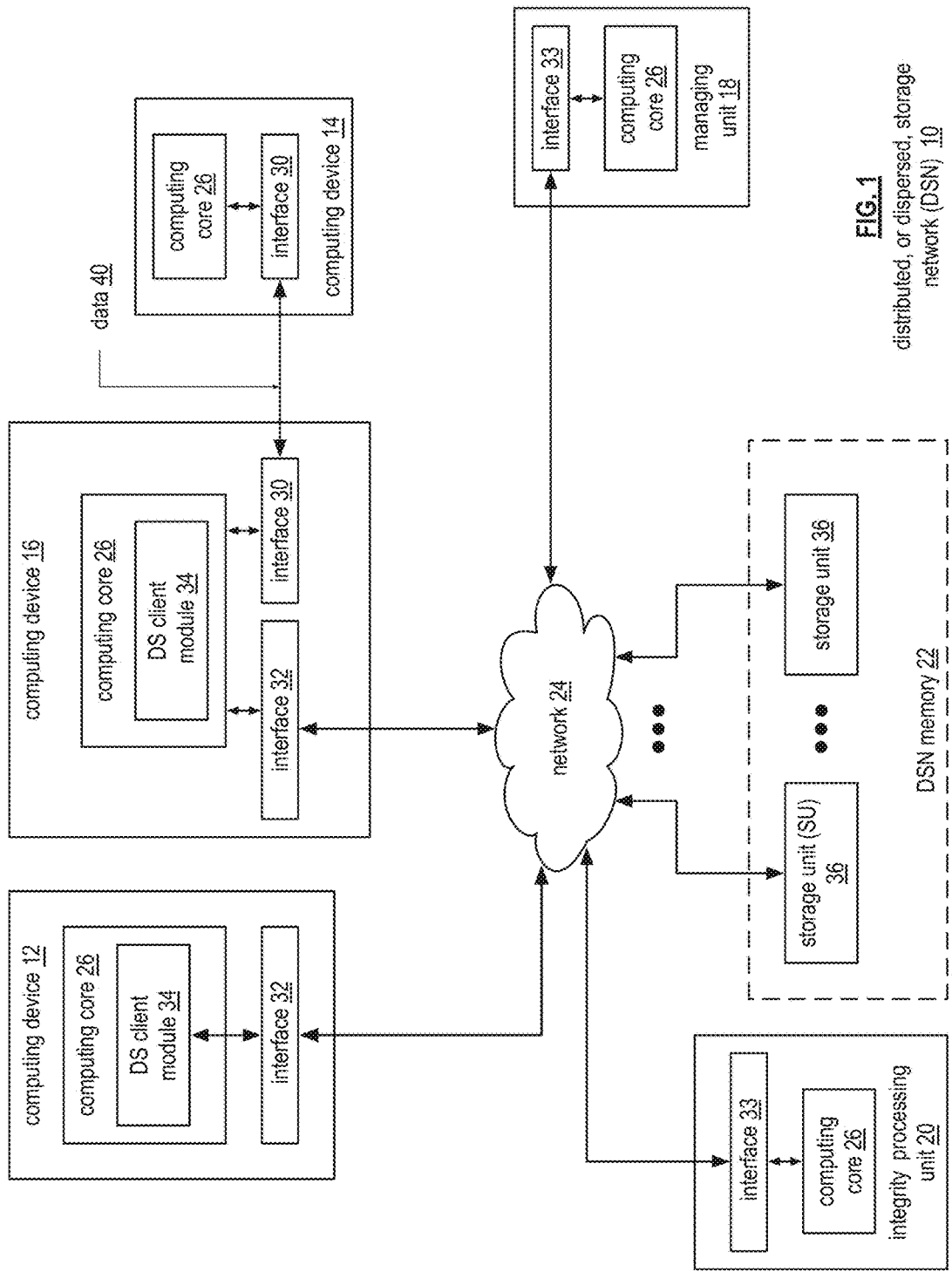
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
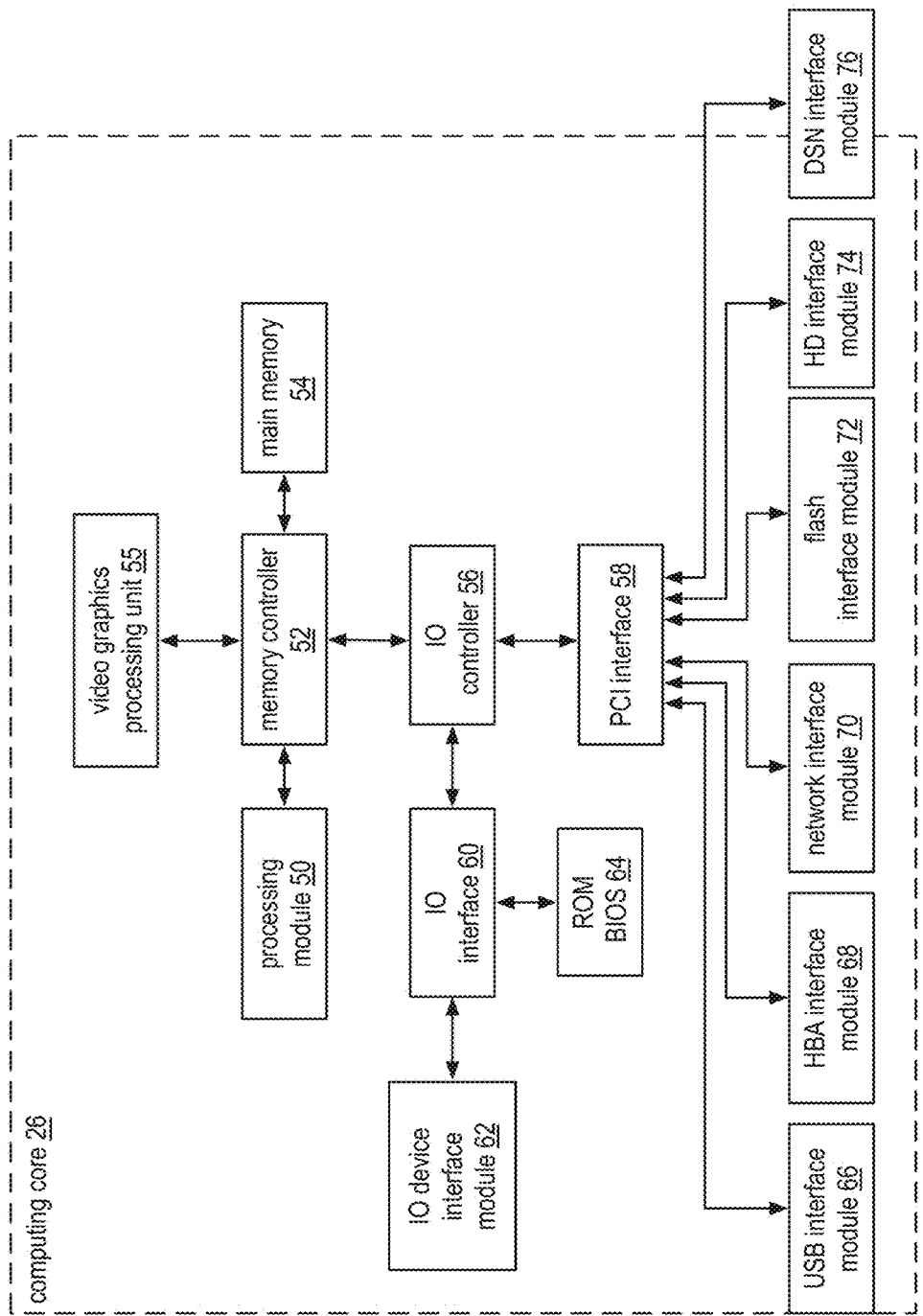
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1—T), a data segment number (e.g., one of 1—Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
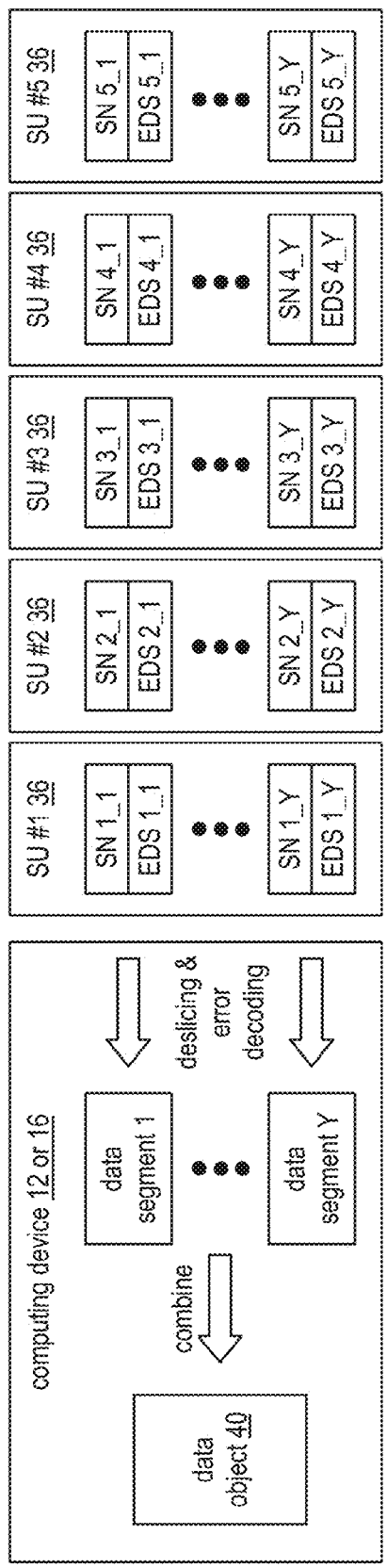
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
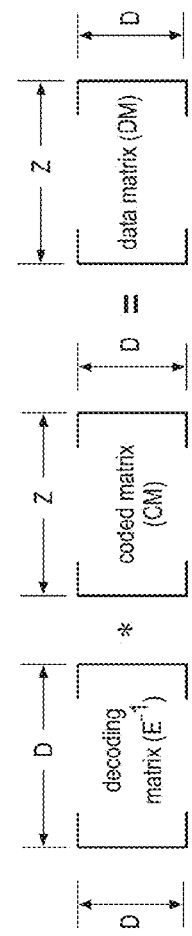
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
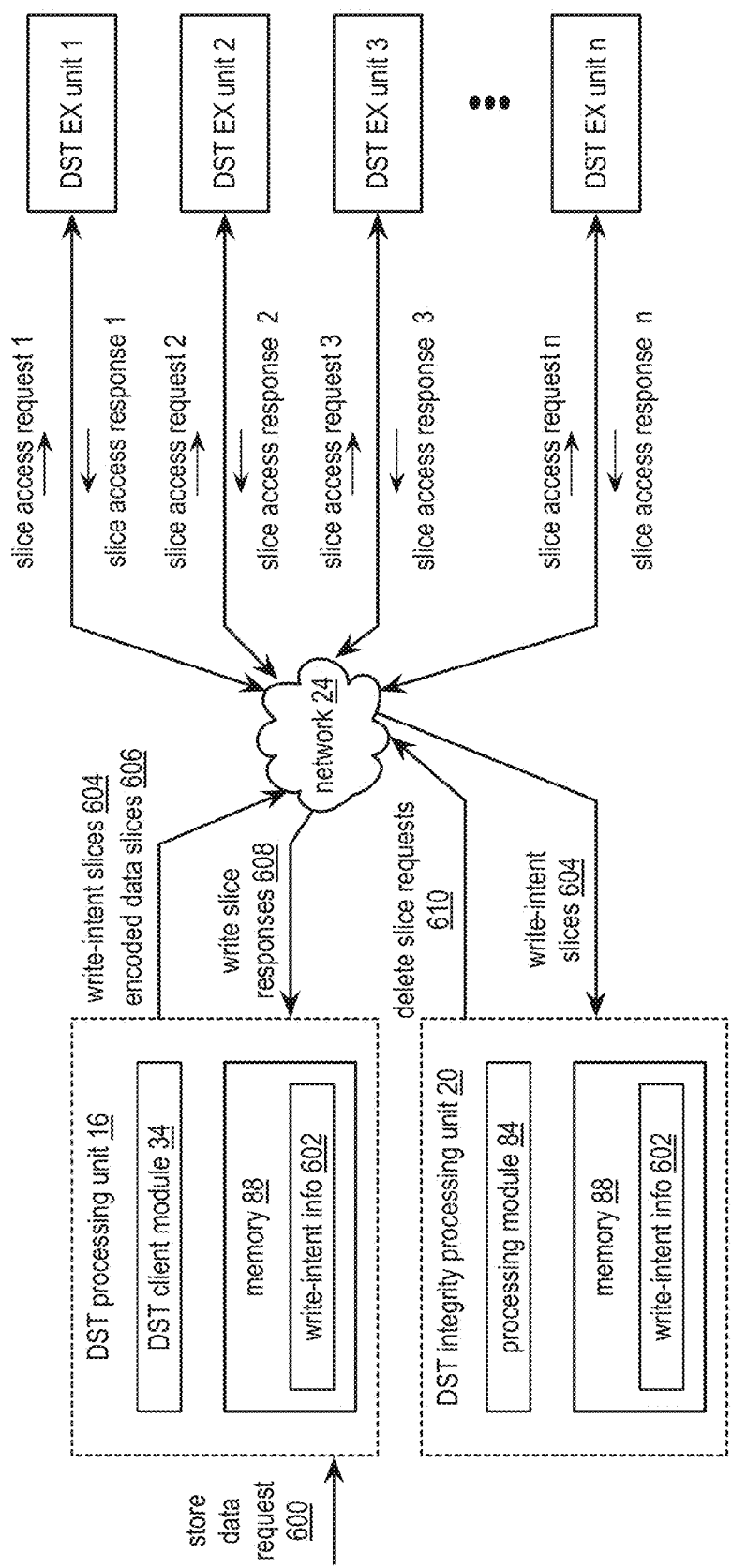
FIG. 9A is a schematic block diagram of an embodiment of a DSN performing a write operation in accordance with the present invention.

FIG. 9A is a schematic block diagram of an embodiment of a DSN performing a write operation. As shown, dispersed storage network (DSN) includes the processing unit, or computing device 16, the integrity processing unit 20, the network 24, and a set of DST execution (EX) units 1-n (e.g., storage units 36).

The DSN functions to maintain integrity of stored data where a large data object is stored as a plurality of sets of encoded data slices in the set of DST execution units. In an example of operation of the maintaining of the integrity of the stored data, the DST client module 34 determines to store a large data object in the set of DST execution units. For example, the DST client module 34 receives a store data request 600 that includes one or more of a portion of the large data object, a size indicator of large data object, and an identifier of the large data object.

Having determined to store the large data object, the DST client module 34 of computing device 16 generates write-intent information 602 based on one or more of the large data object and system storage capability information (e.g., a system performance levels, system capacities, network performance level, available storage, available processing capabilities). For example, the DST client module 34 generates the write-intent information 602 to include one or more of the size indicator of the large data object, a number of regions of the large data object, a region size indicator, a number of data segments per region, a slice name range, a source name associated with the identifier of the large data object, the identifier of the large data object, an identifier of a requesting entity, a current timestamp, and an estimated time to completion of the storing.

Having generated the write-intent information 602, the DST client module 34 stores the write-intent information 602 in the set of DST execution units. For example, the DST client module 34 dispersed storage error encodes the write-intent information 602 to create a set of write-intent slices 604 and sends, via the network 24, the set of write-intent slices 604 to the set of DST execution units for storage. The storing may further include maintaining a local copy of the write-intent information 602 within the memory 88 of the DST processing unit 16.

Having stored the write-intent information 602, the DST client module 34 divides the large data object into one or more regions (e.g., as serially received), and for each region, divides the region into a plurality of data segments, and for each data segment, dispersed storage error encodes the data segment to produce a set of encoded data slices, sends the network 24, each set of encoded data slices 606 to the set of DST execution units for storage (e.g., issues write slice requests as slice access requests 1-n), and receives write slice responses 608 with regards to the storing of the encoded data slices 606.

While storing the large data object, the DST client module 34 updates the stored write-intent information 602. For example, the DST client module 34 recovers the write-intent information 602 from the set of DST execution units (e.g., obtains a decode threshold number of write-intent slices 604, dispersed storage error decodes the decode threshold number of write-intent slices to reproduce the write-intent information 602), updates the timestamp with an updated current timestamp, and stores the updated write-intent information 602 in the set of DST execution units.

While the large data object is being stored, the processing module 84 recovers the write-intent information 602 from the set of DST execution units. For example, the processing module 84 issues read slice requests as slice access requests to the set of DST execution units, receives read slice responses, extracts the write-intent slices 604 from the read slice responses, and dispersed storage error decodes a decode threshold number of extracted write-intent slices to reproduce the write-intent information 602. Having reproduced the write-intent information 602, the processing module 84 stores the write-intent information 602 in the memory 88 of the DST integrity processing unit 20.

Having recovered the write-intent information 602, the processing module 84 determines whether the storing of the large data object has stalled and/or failed. For example, the processing module 84 indicates that the storing has stalled when a difference between a timestamp of the write-intent information 602 and a current timestamp is greater than a timestamp threshold level. As another example, the processing module 84 indicates that the storing has stalled when detecting that a write threshold number of write locks does not exist when write locks are utilized. As yet another example, the processing module 84 interprets a received error message indicating that the storing of the large data object has stalled and/or failed.

When the storing of the large data object has stalled, the processing module 84 initiates deleting of one or more portions of the large data object from the set of DST execution units. For example, the processing module 84 issues, via the network 24, delete slice requests 610 to the set of DST execution units for the slice name range of the large data object to the set of DST execution units and issues delete slice requests 610 to delete the write-intent information 602 from the set of DST execution units.

Figure 9B:
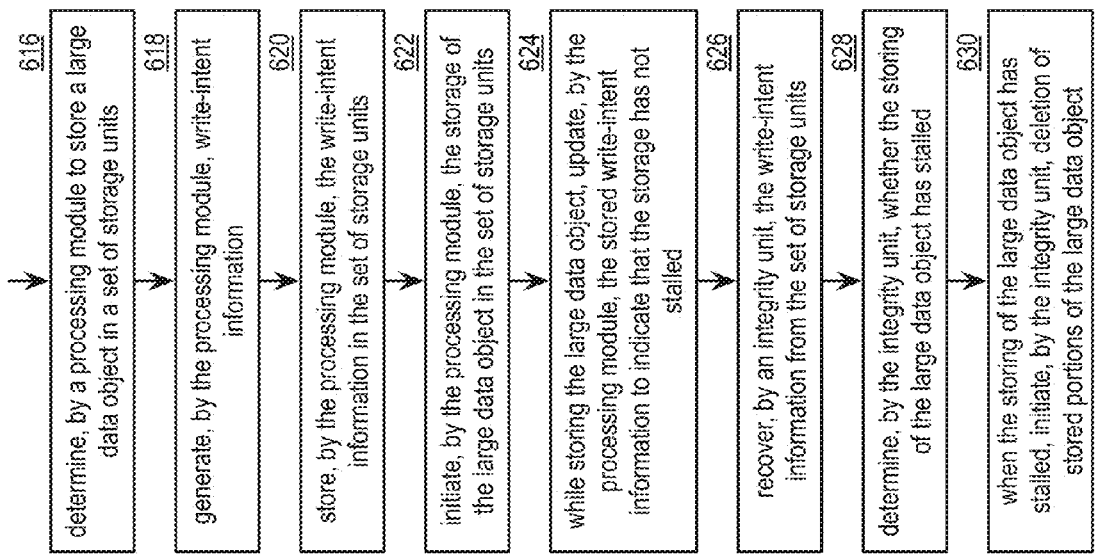
FIG. 9B is a logic diagram of an embodiment of a method for performing a write operation in accordance with the present invention.

FIG. 9B is a logic diagram of an embodiment of a method for performing a write operation. The method includes step 616 where a processing module of a computing device determines to store a large data object in a set of storage units. For example, the processing module receives a store data request. As another example, the processing unit identifies a failed previous attempt to store the large data object. The method continues at step 618 where the processing module generates write-intent information. The method continues at step 620 where the processing module stores the write-intent information in the set of storage units. For example, the processing unit dispersed storage error encodes the write-intent information to produce a set of write-intent slices, and sends the set of write-intent slices to the set of storage units for storage.

The method continues at step 622 where the processing module initiates a storage of the large data object in the set of storage units. For example, the processing module encodes portions of the large data object to produce encoded data slices and sends the encoded data slices to the set of storage units for storage. While storing large data object, the method continues at step 624 where the processing module updates the stored write-intent information to indicate that the storing has not stalled. For example, the processing module determines that an update time frame has expired and updates the current timestamp of the stored write-intent information.

The method continues at step 626 where an integrity unit recovers the write-intent information from the set of storage units. For example, the integrity unit obtains the write-intent slices from the set of storage units and dispersed storage error decodes the obtained write-intent slices to reproduce the write-intent information. The method continues at step 628 where the integrity unit determines whether the storing of the large data object has stalled. For example, the integrity unit indicates that the storing has stalled when a difference between a recovered timestamp of the recovered write-intent information and a current timestamp is greater than a timestamp threshold level. As another example, the integrity unit interprets a received error message.

When the storing of the large data object has stalled, the method continues at step 630 where the integrity unit initiates deletion of stored portions of the large data object. For example, the integrity unit issues delete slice requests for a slice name range of the large data object to the set of storage units and issues delete slice requests to delete the set of write-intent slices from the set of storage units.

Figure 9C:
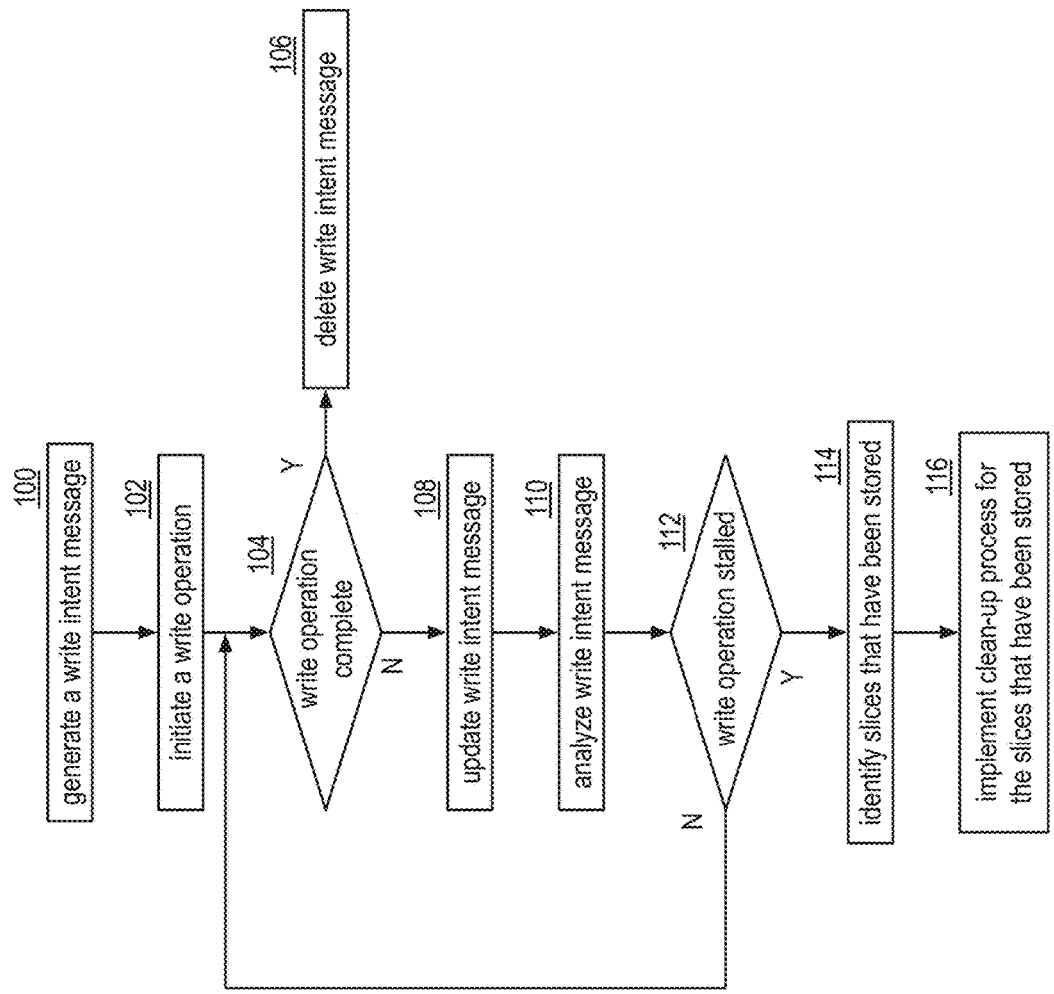
FIG. 9C is a logic diagram of another embodiment of a method for performing a write operation in accordance with the present invention.

FIG. 9C is a logic diagram of another embodiment of a method for performing a write operation. The method begins at step 100 where a computing device generates a write intent message regarding a data object that is to be written into a set of storage units of the DSN as a plurality of sets of encoded data slices. The write intent message includes information regarding a write operation for writing the plurality of sets of encoded data slices of a data object into a set of storage units. The information includes a number of sets of encoded data slices, progress of storing the sets of encoded data slices (which is set to 0 when the message is created), the storage units, an anticipated completion time, a writing rate (e.g., how many sets of encoded data slices are being written in a given time frame), slice names for the plurality of sets of encoded data slices, network operational rates (e.g., bandwidth, latency, error rates, etc.), and/or data size of the plurality of sets of encoded data slices.

Once the write intent message is created, the computing device may store it in local memory (e.g., cache, hard drive of the computing device) or stored in the DSN memory 22. When the computing device stores the write intent message in the DSN memory 22, it dispersed storage error encodes the write intent message to produce a set of encoded message slices. The computing device then sends the set of encoded message slices to the set of storage units for storage therein.

The method continues at step 102 where the computing device initiates a write operation for storing the sets of encoded data slices in the set of storage units. In an embodiment, the write operation includes a plurality of sets of write request regarding the plurality of sets of encoded data slices. As an example, the computing device sends a first set of write requests regarding a first set of encoded data slices to the set of storage units. Continuing with the example, the computing device then sends a second set of write requests regarding a second set of encoded data slices to the set of storage units.

The method continues at step 104 where the computing device determine whether the write operation of the data object has been completed. When it has, the method continues at step 106 where the computing device deletes the write intent messages. When the write operation has not been completed, the method continues at step 108 where the computing device updates the write intent message to indicate progression of the write operation. The method continues at step 110 where another (e.g., a second) computing device of the DSN analyzes the write intent message to determine whether the write operation has stalled.

As an example of updating and analyzing, the computing device updates the write intent message by including a time-stamp of a most current successful write of a set of encoded data slices. The second computing device analyzes the write intent message to determine whether, a period of time from the most current time-stamp to the time of the current analysis has exceed a time period threshold. If so, the second computing device determines that write operation has stalled.

As another example of updating and analyzing, the computing device updates the write intent message by utilizing a heart-beat lock function within the set of storage units. The heart-beat lock function periodically (e.g., once a minute, an hour, a day, etc.) re-asserts a lock (e.g., a lock on storage locations within the storage units allocated for storing the encoded data slices of the data object) within each of the storage units. If the lock is not re-asserted within a given period of time, the lock is released. The second computing device determines whether the locks of storage units is active or whether it has been released. When the locks have been released, the second computing device determines that the write operation has stalled.

If the write operation is still active, the method repeats at step 104. When the write operation has stalled, the method continues at step 114 where the second computing device identifies sets of encoded data slices of the plurality of sets of encoded data slices that have been successfully stored by the set of storage units. The method continues at step 116 where the second computing device implements a clean-up process for the sets of encoded data slices. For example, the second computing device issues delete commands to the set of storage units to delete the sets of encoded data slices that have been successfully stored.

Figure 10A:
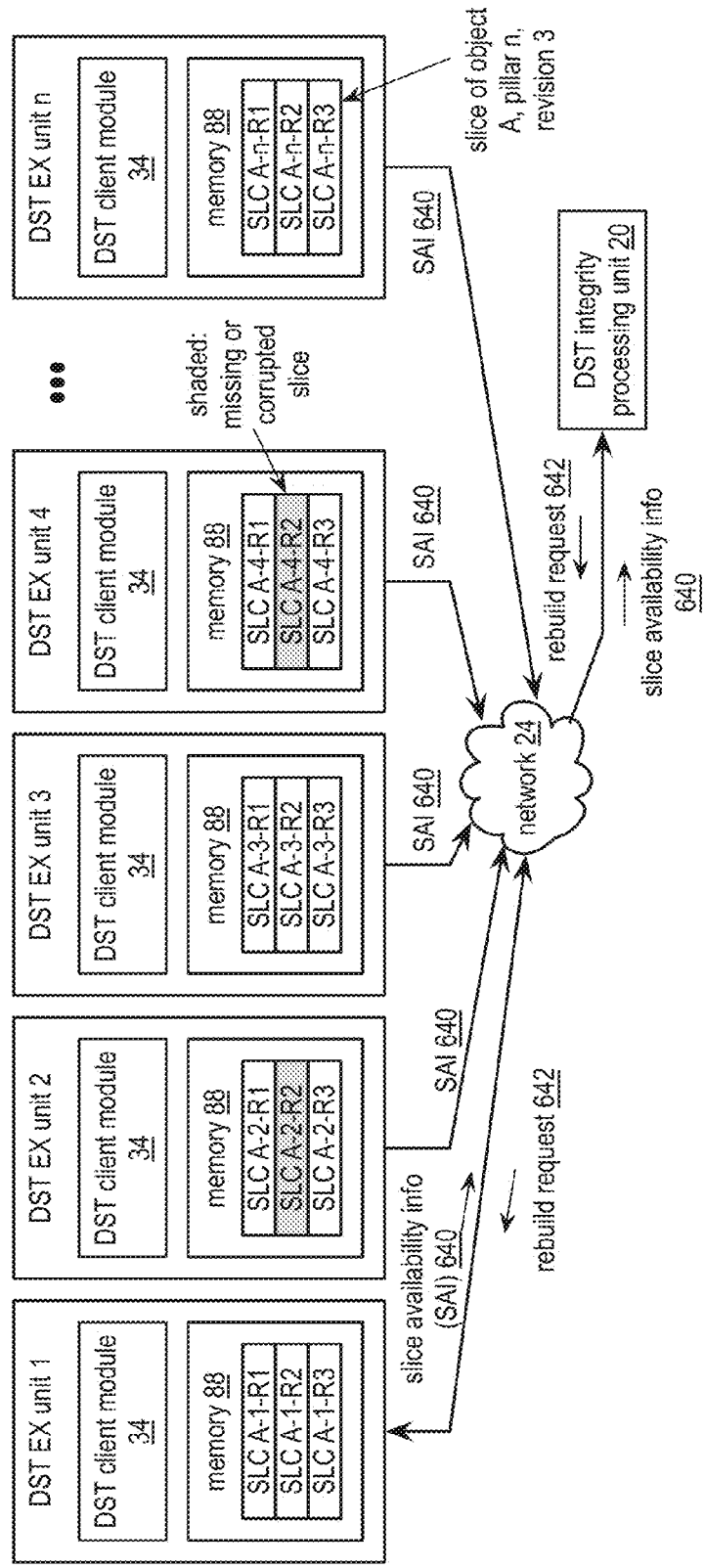
FIG. 10A is a schematic block diagram of an embodiment of a DSN performing a distributed rebuilding operation in accordance with the present invention.

FIG. 10A is a schematic block diagram of an embodiment of a DSN performing a distributed rebuilding operation. As shown, the dispersed storage network (DSN) includes a set of distributed storage and task (DST) execution units 1-n (e.g., computing devices 12-20 of FIG. 1), the network 24, and the integrity processing unit 20. Each DST execution unit includes the DST client module 34 and memory.

The DSN functions to select an encoded data slice rebuilding resource when detecting a storage error (e.g., missing slice, corrupted slice) associated with an encoded data slice of a set of encoded data slices stored in the set of DST execution units. In an example of operation of the selecting of the encoded data slice rebuilding resource, the DST integrity processing unit 20 detects a storage error associated with the encoded data slice of the set of encoded data slices, where a data segment was dispersed storage error encoded to produce the set of encoded data slices. The data segment is associated with a revision level and the set of encoded data slices are associated with the revision level. The set of encoded data slices are further associated with a set of corresponding slice names and a corresponding slice name of the set of slice names associated with the encoded data slice of the storage error. The detecting includes at least one of interpreting read slice responses, interpreting list slice responses, and interpreting an error message. For example, the DST integrity processing unit obtains slice availability information 640 (e.g., a slice name, a revision level, and availability level) from each of the DST execution units with regards to available encoded data slices of each of the sets of encoded data slices stored in the set of DST execution units. For instance, the DST integrity processing unit 20 detects storage errors associated with encoded data slices A-2-R2 and A-4-R2 corresponding to a set of encoded data slices of a second revision of a data segment A.

Having detected the storage error, the DST integrity processing unit 20 identifies available encoded data slices of the set of encoded data slices as candidate encoded data slices to be utilized for a rebuilding process to produce a rebuilt encoded data slice for the encoded data slice of the storage error. The identifying includes at least one of interpreting read slice responses, interpreting list slice responses, and identifying available slices of the revision level from the responses. For example, the DST integrity processing unit identifies encoded data slices A-1-R2, A-3-R2, and others of the set of encoded data slices associated with the second revision of the data segment A.

Having identified the available encoded data slices of the set of encoded data slices as candidate encoded data slices, the DST integrity processing unit 20 identifies DST execution units associated with the identified available encoded data slices of the revision level. For example, the DST integrity processing unit 20 identifies DST execution units 1, 3, and others.

Having identified the DST execution units associated with the identified available encoded data slices, the DST integrity processing unit 20 selects a DST execution unit of the set of DST execution units to perform the rebuilding process to produce a rebuilding unit. For example, the DST integrity processing unit 20 selects a DST execution unit that includes an encoded data slice of the revision required for the rebuilding. For instance, the DST integrity processing unit 20 selects the DST execution unit 1 when the encoded data slice A-1-R2 is available and may be utilized in the rebuilding process.

Having selected the rebuilding unit, the DST integrity processing unit 20 issues via the network 24, a rebuild request 642 to the rebuilding unit to initiate the rebuilding process. For example, the DST integrity processing unit 20 generates the rebuild request 642 to include one or more of the slice name of the encoded data slice to be rebuilt, the revision level, the identified available encoded data slices for the rebuilding process, identifiers of the identified DST execution units associated with the identified available encoded data slices. Having generated the rebuild request, the DST integrity processing unit sends, via the network 24, the rebuild request to the DST execution unit 1.

Having received the rebuild request 642, the rebuilding unit obtains a decode threshold number of encoded data slices of the set of encoded data slices that includes the encoded data slice of the storage error, where at least one encoded data slice includes a locally retrieved encoded data slice, dispersed storage error decodes the obtained decode threshold number of encoded data slices to reproduce the data segment, dispersed storage error encodes the reproduced data segment to produce the rebuilt encoded data slice, and facilitate storage of the rebuilt encoded data slice (e.g., sends, via the network 24, the rebuilt encoded data slice to a DST execution unit corresponding to the encoded data slice of the storage error).

FIG. 10B is a logic diagram of an embodiment of a method for performing a distributed rebuilding operation. The method includes step 650 where a processing module of a storage unit (which includes the computing core as shown in FIG. 2) detects a storage error associated with an encoded data slice. The detecting includes at least one of interpreting an error message, interpreting read slice responses, and interpreting a list slice responses. The method continues at step 652 where the processing module identifies available encoded data slices of a set of encoded data slices that includes encoded data slice. The identifying includes at least one of interpreting read slice responses and interpreting list slice responses.

The method continues at step 654 where the processing module identifies storage units associated with the available encoded data slices. The identifying includes at least one of interpreting a dispersed storage network (DSN) directory, interpreting an index, and interpreting an encoded data slice location table. The method continues at step 656 where the processing module selects a storage unit of the identified storage units to perform a rebuilding process. For example, the processing module identifies a storage unit associated with storage of at least one of the available encoded data slices of the set of encoded data slices (e.g., a slice name and revision level matches).

The method continues at step 658 where the processing module issues a rebuild request to the selected storage unit. The issuing includes the processing module generating the rebuild request to include one or more of identifiers of the identified available encoded data slices, identifiers of the identified storage units, a slice name associated with encoded data slice to be rebuilt, and a revision level. The issuing further includes sending the rebuild request to the selected storage unit.

The method continues at step 660 where the selected storage unit initiates the rebuilding process based on the rebuild request. The initiating includes one or more of obtaining representations of at least a decode threshold number of encoded data slices of the set of encoded data slices from at least some of the identified storage units, dispersed storage error decoding the obtained representations of the decode threshold number of encoded data slices to reproduce a data segment, dispersed storage error decoding the reproduced data segment to produce the rebuilt encoded data slice, and facilitate storage of the rebuilt encoded data slice (e.g., sending the rebuilt encoded data slice to another storage unit of the set of storage units, where the other storage unit is associated with storage of the encoded data slice).

Figure 10C:
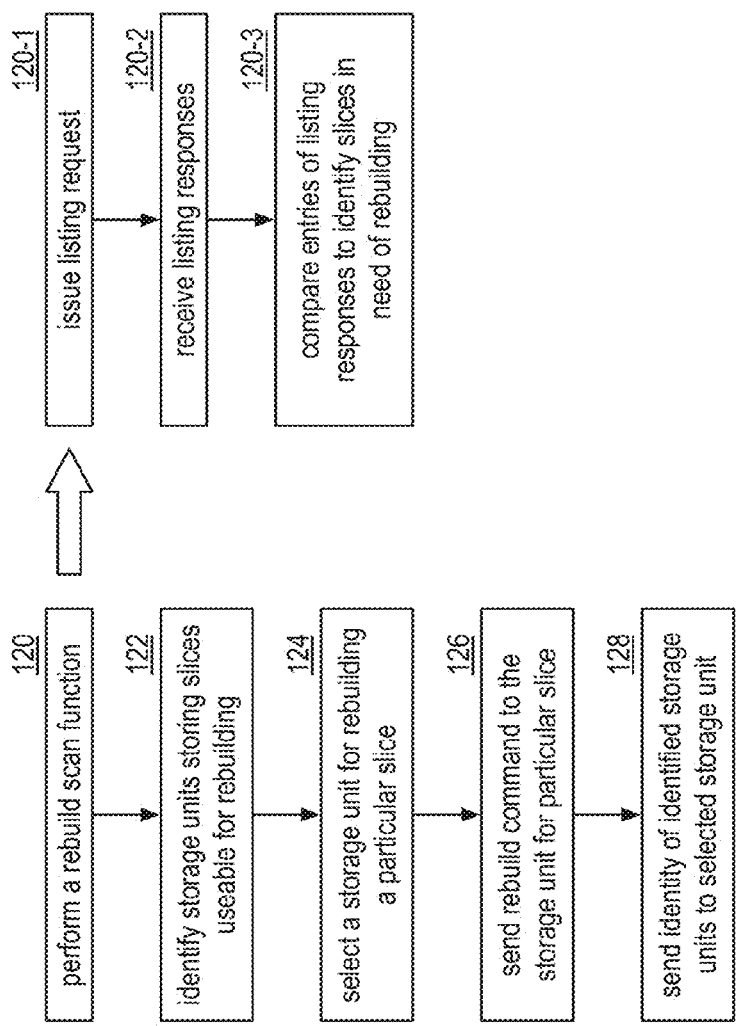
FIG. 10C is a logic diagram of an embodiment of a method for performing a distributed rebuilding operation in accordance with the present invention.

FIG. 10C is a logic diagram of an embodiment of a method for performing a distributed rebuilding operation. The method begins at step 120 where a storage unit performs a rebuild scanning function to identify an encoded data slice in need of rebuilding. Note that one or more storage units are performing the rebuild scanning function for different portions of the DSN address space that is supported by the set of storage units. For instance, a first storage unit scans a first portion of the DSN address space, a second storage unit scans a second portion of the DSN address space, and so on.

As an example of rebuild scanning, the storage unit, at step 120-1, issues listing requests to storage units of a set of storage units regarding encoded data slices that they store. For instance, a listing request includes a request for a particular storage unit to provide a list of slice names and revision levels of encoded data slices that the particular storage unit is storing.

The example continues at step 120-2 where storage unit receiving list responses for the at least storage units, where a list response includes a list of slice names and revision levels of encoded data slices stored by storage unit associated with the response. The example continues at step 120-3 where, for a set of encoded data slices, the storage unit compares corresponding list entries of the list responses to identify the encoded data slice in need of rebuilding. As a specific example, if one list response does not include a slice name for an encoded data slice of the set, but other list responses do include slice names of other slices in the set, then the missing slice is in need of rebuilding. As another example, if one list response includes a different revision level for an encoded data slice of the set than what is listed in the other list responses for the set, the encoded data slice having the outdated revision level is in need of rebuilding.

The method continues at step 122 where the storage unit identifies storage units storing encoded data slices of the set of encoded data slices that are usable for rebuilding the encoded data slice in need of rebuilding. As an example, the storage unit determines that a list entry regarding the encoded data slice in need of rebuilding is blank. The example continues with the storage unit determining that list entries regarding other encoded data slices of the set of encoded data slices contain slice names and a corresponding revision level. The example continues with the storage unit identifying the identified storage units as the storage units that provided the list entries regarding the other encoded data slices of the set of encoded data slices contain slice names and the corresponding revision level.

The method continues at step 124 where the storage unit selects one of the identified storage units to rebuild the encoded data slice in need of rebuilding based on a selection protocol. For example, storage unit selects the storage units because it stores an encoded data slice that will be used in the rebuilding. As another example, the storage unit selects the storage unit because it stores current and previous revision levels of an encoded data slice that will be used in the rebuilding. As a further example, the storage unit selects the storage unit because it stores an encoded data slice that will be used in the rebuilding and because it is in a site with another storage unit that stores another encoded data slice that will be used in the rebuilding. As a still further example, the storage unit selects the storage unit based on a pseudo random selection process (e.g., a pseudo random number generator, a round robin selection, etc.).

The method continues at step 128 where the storage unit sends a rebuild command to the selected storage unit for rebuilding the encoded data slice. In addition, the storage unit sends the selected storage unit identify of other storage units that store encoded data slices to be used in the rebuilding.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   performing, by a storage unit of a dispersed storage network (DSN), a rebuild scanning function to identify an encoded data slice in need of rebuilding, wherein the encoded data slice in need of rebuilding is one encoded data slice of a set of encoded data slices, wherein a data segment of a data object is dispersed storage error encoded into the set of encoded data slices, wherein the set of encoded data slices is stored in a set of storage units of the DSN, and wherein a decode threshold number of encoded data slices of the set of encoded data slices is needed to recover the data segment;
   identifying, by the storage unit, storage units in the set of storage units storing encoded data slices of the set of encoded data slices that are usable for rebuilding the encoded data slice in need of rebuilding to produce identified storage units;
   selecting, by the storage unit, one of the identified storage units to rebuild the encoded data slice in need of rebuilding based on a selection protocol; and
   sending, by the storage unit, a rebuild command to the one of the identified storage units regarding rebuilding the encoded data slice in need of rebuilding, wherein, in accordance with a rebuilding function, the one of the identified storage units rebuilds the encoded data slice in need of rebuilding.

2. The method of claim 1, wherein performing the rebuild scanning function comprises:
   issuing, by the storage unit, listing requests to at least some storage units of the set of storage units, wherein a listing request of the listing requests is requesting a particular storage unit of the at least some of the storage units to provide a list of slice names and revision levels of encoded data slices that the particular storage unit is storing;
   receiving, by the storage unit, list responses for the at least storage units, wherein a list response of the list responses includes a list of slice names and revision levels of encoded data slices stored by a corresponding one of the at least some storage units;
   for the set of encoded data slices, comparing, by the storage unit, corresponding list entries of the list responses to identify the encoded data slice in need of rebuilding.

3. The method of claim 2, wherein the comparing list entries comprises:
   determining that a current revision level list entry regarding the encoded data slice in need of rebuilding is blank; and
   determining that current revision level list entries regarding other encoded data slices of the set of encoded data slices contain slice names and a corresponding current revision level.

4. The method of claim 2, wherein the comparing list entries comprises:
   determining that a previous revision level list entry regarding the encoded data slice in need of rebuilding is blank; and determining that previous revision level list entries regarding other encoded data slices of the set of encoded data slices contain slice names and a corresponding previous revision level.

5. The method of claim 2, wherein the identifying the identified storage units comprises:
determining that a list entry regarding the encoded data slice in need of rebuilding is blank;
determining that list entries regarding other encoded data slices of the set of encoded data slices contain slice names and a corresponding revision level; and
identifying the identified storage units as the storage units that provided the list entries regarding the other encoded data slices of the set of encoded data slices contain slice names and the corresponding revision level.

6. The method of claim 1, wherein the selecting the one of the identified storage units comprises at least one of:
selecting the one of the identified storage units based on the one of the identified storage units storing an encoded data slice that will be used in the rebuilding of the encoded data slice in need of rebuilding;
selecting the one of the identified storage units based on the one of the identified storage units storing current and previous revision levels of the encoded data slice that will be used in the rebuilding of the encoded data slice in need of rebuilding;
selecting the one of the identified storage units based on the one of the identified storage units storing the encoded data slice that will be used in the rebuilding of the encoded data slice in need of rebuilding and based on the one of the identified storage units being in a site with another one of the identified storage units that stores another encoded data slice of the set of encoded data slices that will be used in the rebuilding of the encoded data slice in need of rebuilding; and
selecting the one of the identified storage units based on a pseudo random selection process.

7. The method of claim 1 further comprises:
sending, by the storage unit, identify of the identified storage units to assist the one of the identified storage units in the rebuilding of the encoded data slice in need of rebuilding.

8. A storage unit of a dispersed storage network (DSN), wherein the storage unit comprises:
an interface;
memory; and
a processing module operably coupled to the interface and to the memory, wherein the processing module is operable to:
perform a rebuild scanning function to identify an encoded data slice in need of rebuilding, wherein the encoded data slice in need of rebuilding is one encoded data slice of a set of encoded data slices, wherein a data segment of a data object is dispersed storage error encoded into the set of encoded data slices, wherein the set of encoded data slices is stored in a set of storage units of the DSN, and wherein a decode threshold number of encoded data slices of the set of encoded data slices is needed to recover the data segment;
identify storage units in the set of storage units storing encoded data slices of the set of encoded data slices that are usable for rebuilding the encoded data slice in need of rebuilding to produce identified storage units;
select one of the identified storage units to rebuild the encoded data slice in need of rebuilding based on a selection protocol; and
send, via the interface, a rebuild command to the one of the identified storage units regarding rebuilding the encoded data slice in need of rebuilding, wherein, in accordance with a rebuilding function, the one of the identified storage units rebuilds the encoded data slice in need of rebuilding.

9. The storage unit of claim 8, wherein the processing module is further operable to perform the rebuild scanning function by:
issue, via the interface, listing requests to at least some storage units of the set of storage units, wherein a listing request of the listing requests is requesting a particular storage unit of the at least some of the storage units to provide a list of slice names and revision levels of encoded data slices that the particular storage unit is storing;
receive, via the interface, list responses for the at least storage units, wherein a list response of the list responses includes a list of slice names and revision levels of encoded data slices stored by a corresponding one of the at least some storage units; and
for the set of encoded data slices, compare corresponding list entries of the list responses to identify the encoded data slice in need of rebuilding.

10. The storage unit of claim 9, wherein the processing module is further operable to compare the list entries by:
determining that a current revision level list entry regarding the encoded data slice in need of rebuilding is blank; and
determining that current revision level list entries regarding other encoded data slices of the set of encoded data slices contain slice names and a corresponding current revision level.

11. The storage unit of claim 9, wherein the processing module is further operable to compare the list entries by:
determining that a previous revision level list entry regarding the encoded data slice in need of rebuilding is blank; and
determining that previous revision level list entries regarding other encoded data slices of the set of encoded data slices contain slice names and a corresponding previous revision level.

12. The storage unit of claim 9, wherein the processing module is further operable to identify the identified storage units by:
determining that a list entry regarding the encoded data slice in need of rebuilding is blank;
determining that list entries regarding other encoded data slices of the set of encoded data slices contain slice names and a corresponding revision level; and
identifying the identified storage units as the storage units that provided the list entries regarding the other encoded data slices of the set of encoded data slices contain slice names and the corresponding revision level.

13. The storage unit of claim 8, wherein the processing module is further operable to select the one of the identified storage units by at least one of:
selecting the one of the identified storage units based on the one of the identified storage units storing an encoded data slice that will be used in the rebuilding of the encoded data slice in need of rebuilding;
selecting the one of the identified storage units based on the one of the identified storage units storing current and previous revision levels of the encoded data slice that will be used in the rebuilding of the encoded data slice in need of rebuilding;

selecting the one of the identified storage units based on the one of the identified storage units storing the encoded data slice that will be used in the rebuilding of the encoded data slice in need of rebuilding and based on the one of the identified storage units being in a site with another one of the identified storage units that stores another encoded data slice of the set of encoded data slices that will be used in the rebuilding of the encoded data slice in need of rebuilding; and selecting the one of the identified storage units based on a pseudo random selection process.

14. The storage unit of claim 8, wherein the processing module is further operable to:

send, via the interface, identify of the identified storage units to assist the one of the identified storage units in the rebuilding of the encoded data slice in need of rebuilding.

\* \* \* \* \*